United States Patent [19]

Stephan et al.

[11] Patent Number: 4,913,564
[45] Date of Patent: Apr. 3, 1990

[54] ADJUSTABLY PRESTRESSED ROLLING BEARING

[75] Inventors: Gerard Stephan, Croissy-sur-Seine; Jean-Denis Labedan, Bourges, both of France

[73] Assignee: Nadella, Vierzon, France

[21] Appl. No.: 317,428

[22] Filed: Mar. 1, 1989

[30] Foreign Application Priority Data

Mar. 4, 1988 [FR] France .................... 88 02776

[51] Int. Cl.$^4$ .................. F16C 33/66; F16C 43/06
[52] U.S. Cl. ............................... 384/518; 384/511
[58] Field of Search ............ 384/499, 500, 505, 510, 384/511, 517, 518, 537, 539, 540, 563

[56] References Cited

U.S. PATENT DOCUMENTS

| 4,325,590 | 4/1982 | Pethis | 384/518 |
| 4,569,602 | 2/1986 | Lundgren | 384/499 |

FOREIGN PATENT DOCUMENTS

| 287103 | 9/1915 | Fed. Rep. of Germany | 384/517 |
| 2115283 | 10/1972 | Fed. Rep. of Germany | |
| 784279 | 4/1935 | France | |
| 416229 | 6/1966 | Switzerland | |
| 1085224 | 9/1967 | United Kingdom | 384/505 |

*Primary Examiner*—Thomas R. Hannon
*Attorney, Agent, or Firm*—Robert E. Burns; Emmanuel J. Lobato

[57] ABSTRACT

The rolling bearing comprises a housing (10), rolling elements (20), at least one ring (30) in two ring parts (31, 32) freely mounted one inside the other and defining raceways (231, 232) on which roll the rolling elements, and an elastically yieldable prestressing device (50). This device is adjustable between two states, namely a first state in which an elastically yieldable member (53) exerts relatively no prestress for permitting the assembly and a second state in which the elastically yieldable member (3) exerts the prestress for normal operation of the bearing. Application in the case where the other ring (40) is a shaft carrying another raceway (240) along which the rolling elements roll.

18 Claims, 3 Drawing Sheets

ADJUSTABLY PRESTRESSED ROLLING BEARING

The present invention relates to prestressed rolling bearings, for example ball bearings, and more particularly to those bearings in which the prestress is adjustable between a first value permitting the maintenance of the rolling elements in the non-mounted state and the mounting of the rolling bearing, and a second value for which the stress is that required for a good operation.

Prestressed rolling bearings are well known in the art.

Among these prestressed rolling bearings, some are of the type in which at least one of the rings is divided into two parts which are freely movably mounted one inside the other for transmitting the prestress.

A rolling bearing of this type is, for example, disclosed in French patent application No. 86 01 718. This document explains how to manufacture a prestressed rolling bearing comprising a housing, an inner ring, an outer ring, rolling elements such as balls placed between the inner and outer rings, at least one elastically yieldable member compressed in the housing between the latter and one of the rings for applying the rolling elements in contact with the inner and outer rings along circular raceways. This rolling bearing is such that the balls travel along raceways some of which are located on the inner ring and the others on the outer ring and it is so arranged that one of the rings is constituted by two parts on each of which one of the contacting raceways is located and which are freely movably fitted one inside the other for transmitting the prestress from the elastically yieldable member to the rolling elements.

All the advantages afforded by this type of rolling bearing are known. It permits an automatic taking up of the play, it is self-centering and self-adaptable to the stress.

This type of rolling bearing is satisfactory for many applications but however has difficulties as concerns its utilization. This is in particular the case when the male member and/or the female member between which it is adapted to be placed is of such nature that this member may itself serve directly as a ring. In such a case, the qualities of this member, possibly after having been subjected to a suitable treatment, for example a heat treatment, enables it to be used directly as a raceway along which the rolling elements such as balls may roll.

This is in particular the situation which arises when this member is a shaft in which a peripheral groove has been provided for receiving the rolling elements.

In using a rolling bearing of the type disclosed in the aforementioned patent application, it can be imagined, if there are imparted thereto the prestress, the rigidity and the required axial disengagement force, that it is possible to engage therein the shaft with its groove without necessity to carry out additional operations on the bearing which are more or less complex.

If a suitably chosen prestress is created in the bearing, it can be so arranged that, when the shaft is engaged in the bearing, the end of the latter which preceeds the groove acts on the balls so as to urge them outwardly by moving apart the two parts of one of the rings, here the outer ring, against which the balls bear, while momentarily increasing the prestress. When the rolling elements are in alignment with the groove, these rolling elements are engaged therein under the action of the prestress which has been momentarily increased and the two parts of the ring which have been temporarily moved apart resume their initial relative position.

While such an assembly is theoreticlaly possible, the characteristics conferred thereon are incompatible with a good operation. Indeed, if it is desired to be in a position to effect an easy assembly, it is clear that the shaft can spontaneously be disengaged under the effect of a force opposed to that of the assembly and then this force is too weak in most cases to provide the desired safety.

In order to overcome this type of difficulties with a rolling bearing of the aforementioned type, it is therefore necessary to so arrange that this bearing has a first state in which its assembly can be proceeded with and a second state which is different from the first state in which, subsequent to the positioning of the rolling bearing, the latter has the required characteristics for its normal operation.

An object of the invention is to manufacture a prestressed rolling bearing in which the prestress is adjustable between a first state in which it has a value permitting its placing in position and a second state in which, when the bearing has been placed in position, the prestress has the required value for the good operation of the rolling bearing.

The invention provides a prestressed rolling bearing comprising a housing, rolling elements travelling along two circular raceways, at least one ring constituted by two ring parts on each of which ring parts one of said raceways is located, said ring parts being freely movably mounted one inside the other so as to be axially slidable, and an elastically yieldable device cooperating with said housing and at least one of said parts so as to bias said two circular raceways axially toward each other and exert a prestress and in which said rolling elements are adapted to come to bear on another ring along at least one other circular raceway.

In this prestressed rolling bearing, said elastically yieldable prestressing device is adjustable between a first state in which the stress is substantially inactive so as to permit placing the rolling elements in contact with said other raceway of said other ring, and a second state in which the prestress is active to permit the rolling elements placed in contact with said three raceways to at least circulate with the required prestress in normal operation.

Further features of the invention will be apparent from the following description and claims with reference to the accompanying drawing which is given solely by way of example and in which:

Figure 1A:
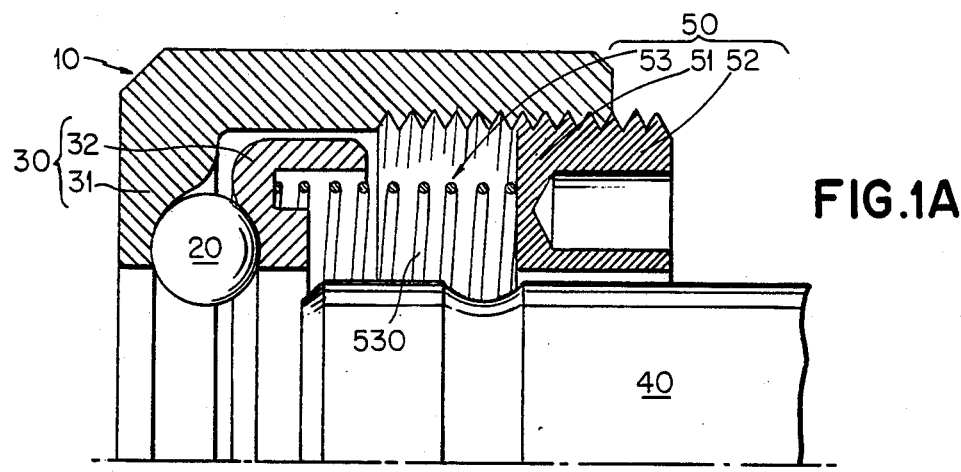
FIGS. 1A, 1B and 1C illustrate a first embodiment of a rolling bearing according to the invention in the different stages of its positioning.

Prestressed rolling bearings, in particular ball bearings, are well known in the art. This is why in the following description only that which concerns the invention will be described. For the rest of the structure, a person skilled in the concerned art will draw on conventional solutions at his disposal for solving the particular problems he encounters.

In the following description, there will be employed the same reference numeral for designating similar parts irrespective of the embodiment of the invention.

Thereinafter it will be assumed that a prestressed rolling bearing according to the invention is intended to be employed with a shaft provided with a groove which directly serves as the other ring with a circular raceway. It is clear that the invention may be easily transposed so that a rolling bearing according to the invention does not cooperate with a shaft placed axially therein but with a bore which is then located around the bearing. The transpositions are easy and do not modify the invention.

A prestressed rolling bearing according to the invention comprises, in respect of the illustrated embodiments, a housing 10, rolling elements 20 such as balls, which may be and are preferably retained in a cage (not shown), a ring 30 made from two ring parts 31 and 32, and an elastically yieldable prestressing device 50 capable of assuming two states, namely a first state in which the stress is substantially inactive for the assembly of the bearing and a second state in which the stress is active so that, when it has been assembled, the rolling bearing according to the invention can operate normally.

Figure 2A:
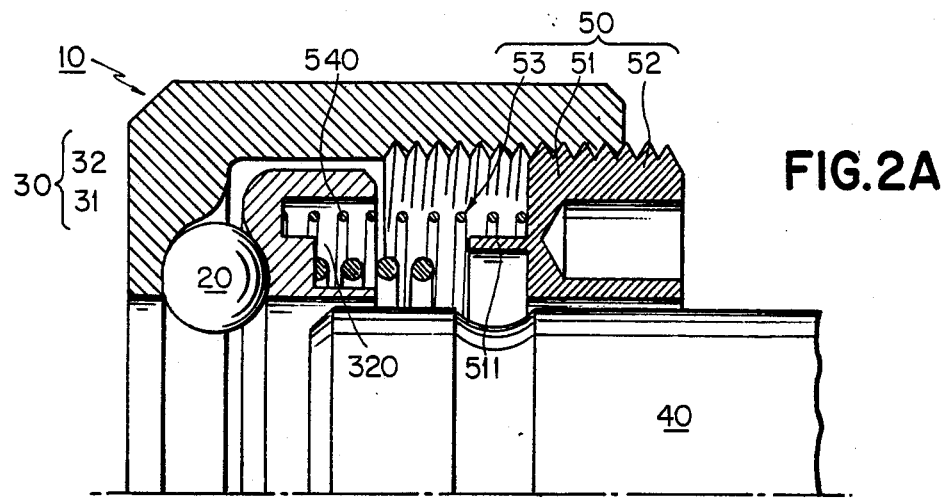
FIGS. 2A, 2B and 2C are similar views of another embodiment.
Figure 2B:
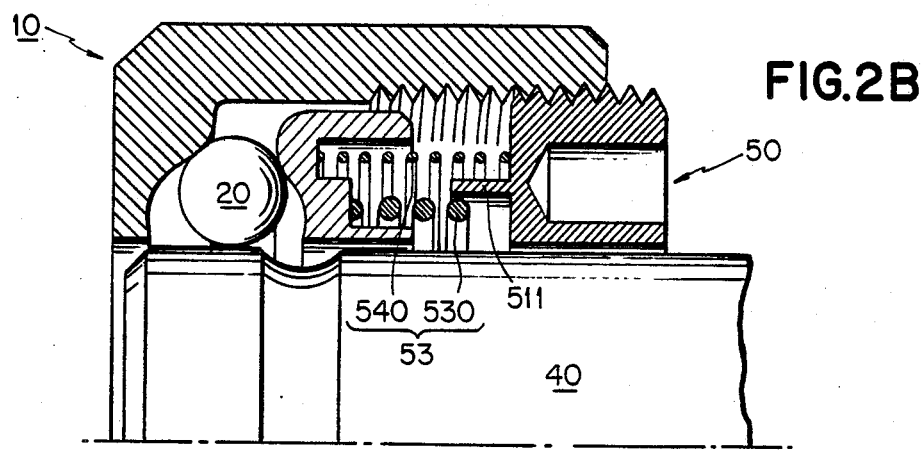
Figure 2C:
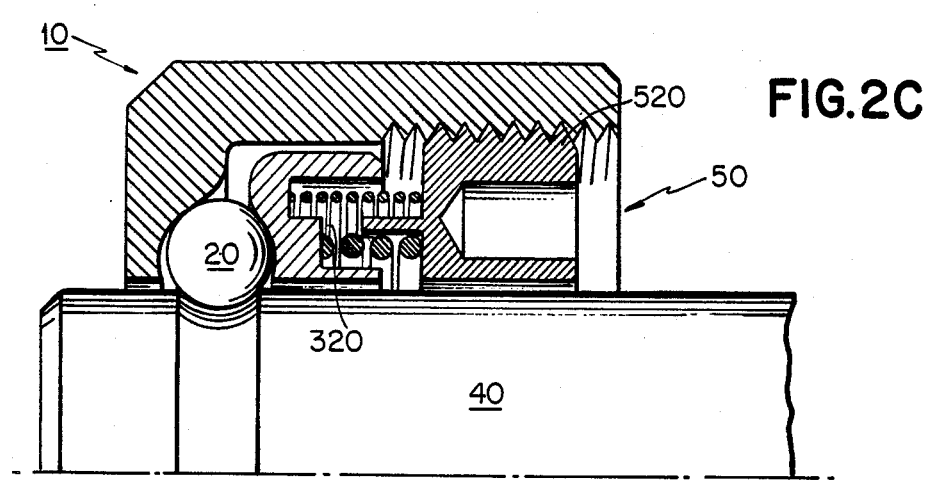
Figure 3:
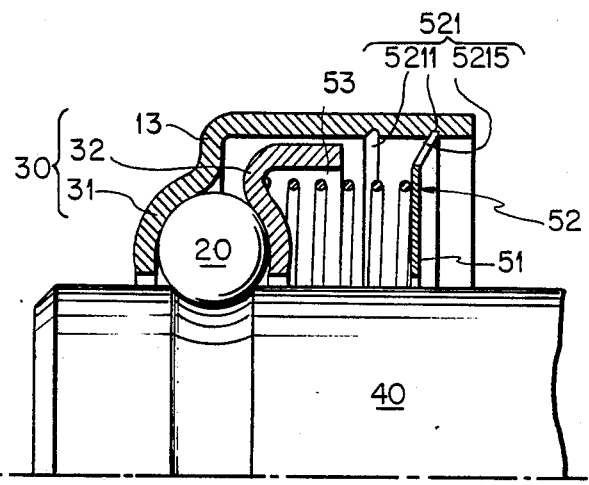
FIG. 3 is a view of another embodiment of the invention in which the rolling bearing is in place but not yet in its maximum prestressed condition.
Figure 4:
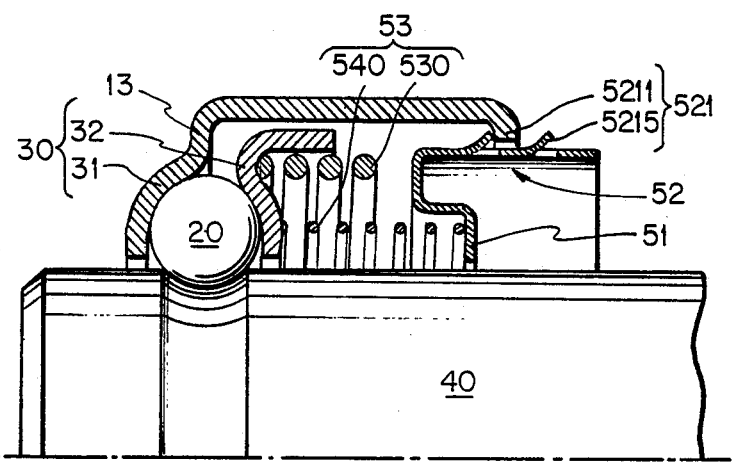
FIG. 4 is a view similar to FIG. 3 of another embodiment of the invention.
Figure 5:
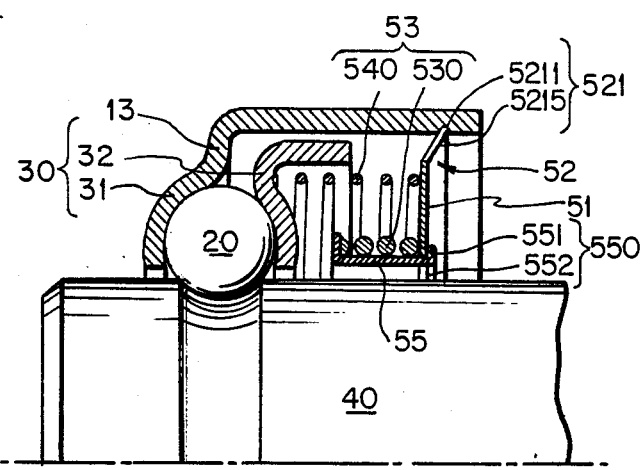
FIG. 5 is a view of another embodiment similar to FIGS. 3 and 4.

In the illustrated embodiments, the housing 10 has a thick wall (FIGS. 1A–1C and 2A–2C) or a thin wall (FIGS. 3, 4, 5). The methods for manufacturing and machining this type of housing are conventional.

As can be seen, in all the embodiments, the housing 10 is directly associated with one of the parts 31 of the ring 30. The housing 10 and the part 31 are, for example, made in a single piece and in the embodiments of FIGS. 3, 4 and 5, are in the form of a socket 13. The other part 32 of the ring 30 is in the form of a cup which is relatively freely movable in the housing or socket so as to be axially slidable therein.

The rolling elements 20, here balls, are adapted to bear against at least each of the parts 31 and 32 along circular raceways 231 and 232 respectively.

The rolling elements are adapted to circulate on at least one other raceway of another ring. In the illustrated embodiments, this other ring 40 is a shaft which defines another raceway 240 along which the rolling elements will roll. This raceway 240 is for example defined by a groove having a meridian cross-section in the shape of an arc of a circle.

As mentioned, the prestressed rolling bearing according to the invention is provided with an elastically yieldable prestressing device 50 adjustable between two states. A first state in which the prestress is substantially inactive to permit the assembly of the rolling bearing, in the presently-described embodiment the mounting thereof on the shaft, and a second state in which the prestress is active to permit, when the bearing has been mounted, a normal operation of the bearing with the required prestress for correct use of the bearing.

The adjustable elastically yieldable prestressing device 50 comprises a support 51, retaining means 52 and an elastically yieldable means 53.

The support 51 is in the form of a ring 510 permitting the free passage of the other ring 40, here the shaft.

The retaining means 52 are adapted to hold the support 51 assembled with the housing 10. These retaining means are adjustable between a first position for placing the device in its first state, and at least a second position for placing the device in its second state.

As will be seen, in all the described embodiments, the support 51 and the retaining means are in a single piece. But it will be clear that the support and the retaining means may be distinct in the form of separate components.

The elastically yieldable means 53 of the prestressing device according to the invention is, for example, a coil spring 530 having one end bearing against the support 51 and the other end bearing against the ring part 32, as illustrated.

Figure 1B:
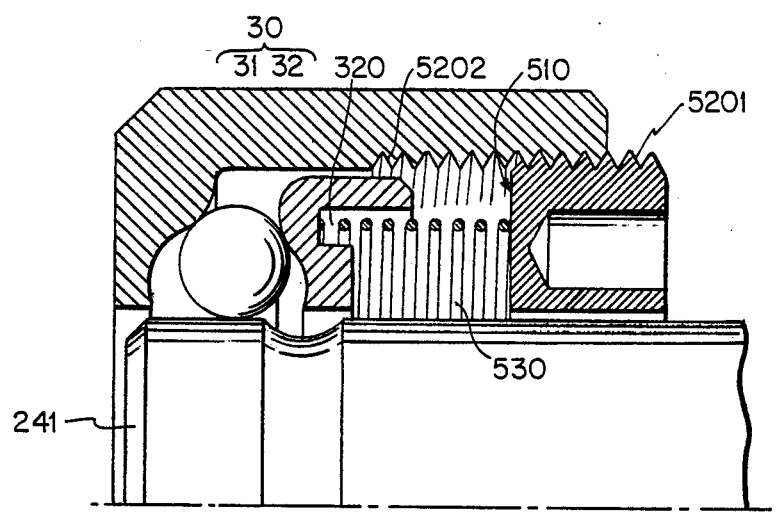
Figure 1C:
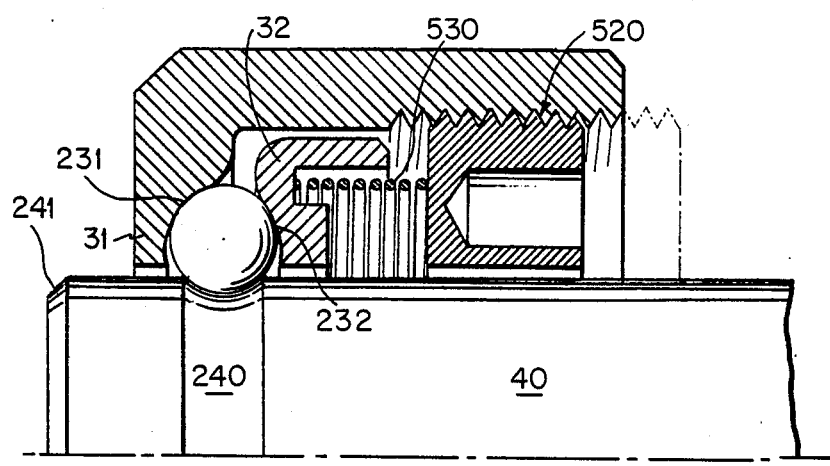

Reference will now be made more particularly to FIGS. 1A, 1B and 1C where a first embodiment of a rolling bearing according to the invention is represented in different steps of its positioning. In this embodiment, the retaining means 52 is in the form of a screw-and-nut mechanism 520.

As can be seen, the support 51 is in the form of a screw carrying screw threads 5201 engaged in a tapped hole 5202 provided in the housing 10.

The coil spring 530 is applied against a planar ring-shaped surface 510 of the support 51 and a channel 320 provided in the other ring part 32 which is in the form of a cup.

In FIG. 1A, the embodiment of a rolling bearing according to the invention is illustrated in the position the elastically yieldable device occupies when it is in its first state in which the prestress is substantially inactive to permit the assembly of the bearing.

As can be seen in this case, the retaining means are substantially unscrewed and disengagd from the housing. In this situation, the coil spring 530 which constitutes the elastically yieldable means is substantially unstressed. The other ring 40, here the shaft with its other raceway 240 which is in the form of a groove, is just engaged and occupies its illustrated position.

Shown in FIG. 1B is an intermediate step in which the elastically yieldable device is still in its first state. It can be seen that, if one continues to engage the shaft 40, a bevel or chamfer 241 encounters the balls 20 and biases them outwardly. In so doing, the balls move the two ring parts 31 and 32 of the ring 30 away from each other owing to the small force exerted by the spring 530 which is substantially unstressed. In continuing to move the shaft into the housing, the balls 20 reach a position in which they are in alignment with the groove 240 and become engaged therein under the action of the spring 530 and the other part 32 of the ring 30 resumes its initial position. This situation is that partly illustrated in FIG. 1C in dot-dash lines.

It is then sufficient to tighten the retaining means by means of a suitable key to cause it to move to the second position and thereby cause the elastically yieldable device to adopt its second state.

As can be seen in FIG. 1C in full lines, the spring 530 is then compressed and exerts the prestress required for a good operation of the bearing.

With this type of solution employing a screw-and-nut mechanism, it is possible to adjust with high precision and progressively the prestress in such manner as to take into account slight variations in the values of the springs commonly encountered in mass-production.

Reference is now made to FIGS. 2A, 2B and 2C, in which a modification of the embodiment shown in FIG. 1 is illustrated. In this embodiment the elastically yieldable means 53 is doubled and there is associated therewith an elastically yieldable element, here another coil spring 540 whose characteristics are different from those of the coil spring 530.

As can be seen, the support 51 in the form of a ring is provided with a rib or bead 511 which separates the two springs and the ring part 32 has a double stepped channel 320. For the rest of the structure, this embodiment is similar to that shown in FIG. 1.

FIGS. 2A, 2B and 2C correspond to the situations illustrated in FIGS. 1A, 1B and 1C and therefore there is no need to give further details.

What distinguishes the embodiments shown in FIG. 1 and FIG. 2 resides in the doubling of the elastically yieldable means. The coil spring 530 exerts substantially no stress when the device is in its first state illustrated in FIG. 2A and a relatively very small stress is exerted by the coil spring 540. Preferably, there is, as can be seen, sufficient clearance to ensure that the coil spring 530 never comes into simultaneous contact with the part 32 and the support 51 when the device is in its first state. In this way, the shaft can easily be placed in position with the small stress exerted by the spring 540.

When the shaft has been placed in position, the screw-and-nut mechanism is tightened so that the coil spring 530 bears simultaneously against the part 32 and the support 51. The stiffness of the spring 530 is adapted to operation under stress of the bearing according to the invention but, as will be seen, it is not compressed during the assembling stage. The existence of the clearance therefore permits an easy relative displacement of the two parts 31 and 32 of the ring 30 under the effect of the thrust exerted by the balls 20 which momentarily move back when the shaft 40 is placed in position. It is then sufficient to tighten the screw-and-nut mechanism 520 to place it in the position illustrated in FIG. 2C.

As mentioned before, the value of the initial prestress can be adjusted with precision. The support may be such that the spring 530 just bears against the support or is somewhat prestressed.

Reference will now be made to FIGS. 3, 4 and 5 in which other embodiments of the bearing according to the invention are illustrated. These Figures correspond to the situation of FIGS. 1C and 2C in which the other ring is placed in position. These various Figures mainly differ by the embodiments of the retaining means 52.

In these various embodiments, the retaining means 52 are constituted by ratchet or interclipping mechanisms 521.

As can be seen, the ratchet mechanism 521 comprises an abutment 5 211 associated with the housing 10. This abutment 5 211 is in the form of at least one groove (FIGS. 3, 5) or a flange (FIG. 4). This mechanism further comprises a pawl or stop 5 215 associated with the support 51. In FIGS. 3 and 5, this stop is in the form of a flange and in FIG. 4 in the form of two successive lugs.

In order to shift the elastically yieldable device 50 from its first state to its second state, it is sufficient to shift the ratchet mechanism 521 from its first position (illustrated in FIGS. 3 and 4) to its second position. The ratchet mechanism is shifted from the first position to the second position after the ring 40 has been placed in position.

As can be seen, here again, the support 51 and the retaining means 52 are in a single piece. They are obtained from thin sheets of suitable material which are shaped, for example, by conventional press-forming operations. In FIG. 4, the lugs have a certain elasticity to be capable of passing in succession beyond the flange.

With reference to the embodiment shown in FIG. 5, it can be seen that the ratchet mechanism 521 is associated with a sleeve 55 which is mounted on the support 51 by means of a breakable connection 550. This breakable connection 550 is constituted by tabs 551 carried by the sleeve 55 which are engaged in complementary recesses 552 in the support 51. These tabs 551 are formed up as illustrated for the purpose of retaining the spring 530 in the compressed state.

With the other ring 40 in postiion, it is then sufficient to break the tabs 551 of the breakable connection 500 to release the spring 530 which then moves from its first state which is alone illustrated, in which the prestress is substantially inactive to its second state (non illustrated) in which the prestress is active and has a value which permits the normal operation of the rolling bearing according to the invention.

All the advantages afforded by the rolling bearing according to the invention will be understood.

It permits large reductions in assembly cost, and also reductions in manufacturing cost, since it comprises only one ring which carries a part of the raceways along which roll the rolling elements, whereas the other ring which carries the complementary raceway or raceways is not part of the structure of the rolling bearing proper. This temporary suppression of one of the rings also permits a reduction in the radial overall size.

The whole interest of the improved prestressed rolling bearing according to the invention will therefore be understood, as concerns manufacture and its positioning and its operation.

We claim:

1. A prestressed rolling bearing comprising a housing, at least one first ring constituted by two ring parts, each ring part defining a circular raceway, rolling elements circulating along the two circular raceways, and said ring parts being freely movably mounted one inside the other so as to be axially slidable, and an elastically yieldable device cooperative with said housing and at least one of said ring parts so as to axially bias said circular raceways toward each other and exert a prestress, a second ring defining a third circular raceway, said rolling elements being adapted to bear against said third raceway, said elastically yieldable prestressing device being adjustable between a first state in which the stress is substantially inactive to permit placing the rolling elements in contact with said third raceway of said second ring, and a second state in which said ring parts of said first ring are freely movable axially relative to one another and are biased axially toward one another by said elastically yieldable device to permit the rolling elements which are in contact with said three raceways at least to circulate with the required prestress for normal operation of the bearing.

2. Rolling bearing according to claim 1, wherein the housing and one of said ring parts are in a single piece in the shape of a socket and the other ring part is disposed in said socket.

3. Rolling bearing according to claim 1, wherein said first ring is an outer ring and said second ring is an inner ring constituted by a shaft in which is provided a peripheral groove constituting said third circular raceway.

4. Rolling bearing according to claim 1, wherein said second ring is an outer ring constituted by a bore.

5. Rolling bearing according to claim 1, wherein the elastically yieldable device comprises a support associated with the housing and permitting the passage of said second ring, retaining means for mounting the support on said housing in such manner as to be adjustable between a first position in which the elastically yieldable device is in said first state thereof, and at least a second position in which the elastically yieldable device is in said second state thereof, and at least an elastically yieldable element disposed between said support and one of said ring parts.

6. Rolling bearing according to claim 5, wherein said support is a collar adapted to be disposed at least partly in said housing.

7. Rolling bearing according to claim 5, wherein the elastically yieldable element is a coil spring having one end adapted to come in contact with said support and an opposite end adapted to come in contact with the other ring part.

8. Rolling bearing according to claim 5, wherein the retaining element maintains in said first position thereof the elastically yieldable element relatively neutralized and in the second position thereof renders the elastically yieldable element operative.

9. Rolling bearing according to claim 8, wherein when the retaining means are in the first position thereof, the elastically yieldable element is substantially unstressed and, when said retaining means are in the second position thereof, the elastically yieldable element is compressed.

10. Rolling bearing according to claim 8, wherein, when the retaining means occupy the first position thereof, the elastically yieldable element is compressed, and when the retaining means occupy the second position thereof, the elastically yieldable element is released.

11. Rolling bearing according to claim 10, further comprising a sleeve mounted on the support by means of a breakable connection, the elastically yieldable element being carried by the sleeve.

12. Rolling bearing according to claim 5, wherein the retaining means comprise a screw-and-nut mechanism carried by the housing and the support.

13. Rolling bearing according to claim 5, wherein the retaining means comprise a clipping mechanism.

14. Rolling bearing according to claim 13, wherein the clipping mechanism comprises at least one edge portion carried by the support and an abutment carried by the housing.

15. Rolling bearing according to claim 14, wherein the edge portion is a peripheral flange of the support and the abutment is a groove provided in the housing.

16. Rolling bearing according to claim 13, wherein the edge portion is at least one peripheral relatively elastic lug of the support and the abutment is an inwardly extending flange of the housing.

17. Rolling bearing according to claim 5, wherein the elastically yieldable element is adapted to bear in a channel of said other ring part.

18. Rolling bearing according to claim 5, wherein the elastically yieldable element is doubled and also comprises an elastically yieldable element interposed between the support and one of the ring parts so as to bias the ring parts away from each other and create said first state.

* * * * *